United States Patent
Walker et al.

(10) Patent No.: US 9,157,548 B2
(45) Date of Patent: Oct. 13, 2015

(54) FOOT ACTUATED FAUCET

(71) Applicants: Ross Walker, Bozeman, MT (US);
David Yakos, Bozeman, MT (US);
Christopher Kirn, Campbell, CA (US);
Marc Warsowe, Redwood City, CA (US)

(72) Inventors: Ross Walker, Bozeman, MT (US);
David Yakos, Bozeman, MT (US);
Christopher Kirn, Campbell, CA (US);
Marc Warsowe, Redwood City, CA (US)

(73) Assignee: 456CORP, Redwood City, CA (US)

( * ) Notice: Subject to any disclaimer, the term of this patent is extended or adjusted under 35 U.S.C. 154(b) by 0 days.

(21) Appl. No.: 14/079,835

(22) Filed: Nov. 14, 2013

(65) Prior Publication Data
US 2014/0131604 A1   May 15, 2014

Related U.S. Application Data

(60) Provisional application No. 61/727,033, filed on Nov. 15, 2012, provisional application No. 61/861,935, filed on Aug. 2, 2013.

(51) Int. Cl.
| *F16K 31/46* | (2006.01) |
| *F16K 27/04* | (2006.01) |
| *F16K 31/62* | (2006.01) |
| *E03C 1/05*  | (2006.01) |
| *G05G 1/44*  | (2008.04) |

(52) U.S. Cl.
CPC .............. *F16K 31/465* (2013.01); *F16K 27/041* (2013.01); *E03C 1/052* (2013.01); *F16K 31/62* (2013.01); *G05G 1/44* (2013.01); *Y10T 137/87161* (2015.04)

(58) Field of Classification Search
CPC ....... F16K 31/62; F16K 31/46; F16K 31/465; F16K 27/041; E03C 1/052; G05G 1/44; Y10T 137/87153; Y10T 137/87161; Y10T 137/86558
USPC ............. 137/594, 595, 625.18; 251/294, 295, 251/322; 4/623
See application file for complete search history.

(56) References Cited

U.S. PATENT DOCUMENTS

| 1,212,085 | A | * | 1/1917 | Metcalf ........................ 251/236 |
| 1,848,456 | A | * | 3/1932 | Beebe ................................ 4/676 |
| 2,830,618 | A | * | 4/1958 | Mitchell .................. 137/599.03 |
| 3,865,139 | A | * | 2/1975 | Tolnai ...................... 137/625.19 |
| 3,937,253 | A | * | 2/1976 | Lilja ........................ 137/625.18 |
| 3,973,583 | A | * | 8/1976 | Sorenson ...................... 137/312 |
| 5,199,119 | A | * | 4/1993 | Weber .............................. 4/619 |
| 5,230,365 | A | * | 7/1993 | Woltz et al. .................. 137/607 |
| 5,511,763 | A | * | 4/1996 | Green ...................... 251/129.02 |
| 7,374,147 | B2 | * | 5/2008 | Nohl et al. ............... 251/129.04 |
| 8,307,851 | B2 | | 11/2012 | Warsowe |
| 2011/0001075 | A1 | * | 1/2011 | Warsowe ...................... 251/231 |

* cited by examiner

*Primary Examiner* — Matthew W Jellett
(74) *Attorney, Agent, or Firm* — Hackler Daghighian & Martino

(57) ABSTRACT

A hands-free faucet control device includes a water valve assembly and a foot pedal assembly. The water valve assembly includes a housing with two input ports and two output port configured to be attachable in series with a hot water pipe and a cold water pipe. A valve includes two through holes and is movable in the housing between a closed position and an open position. In the open position the two through holes are in alignment with the two input and output ports. In the closed position the two through holes are not in alignment with the two input and output ports. A spring is biased against the valve keeping the valve in the closed position. The single valve reduces costs, increases reliability and simplifies ease of installation. The foot actuated faucet can also be configured to remain in the down/on position through various mechanical structures.

22 Claims, 12 Drawing Sheets

FOOT ACTUATED FAUCET

CROSS-REFERENCE TO RELATED APPLICATIONS

This application claims priority to provisional application 61/727,033 filed on Nov. 15, 2012, and also provisional application 61/861,935 filed on Aug. 2, 2013. The contents of both provisional applications are incorporated herein in their entirety.

DESCRIPTION

1. Field of the Invention

The present invention generally relates to plumbing. More specifically, the present invention relates to improvements for a foot actuated faucet.

2. Background of the Invention

This patent application is an improvement to the previously filed U.S. Pat. No. 8,307,851 issued on Nov. 13, 2012, the contents of which are fully incorporated herein in its entirety.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Faucets and faucet sets are known. Some faucet sets have two separate faucet valves and a valve handle for each faucet valve, one for hot water and one for cold water, respectively. Each valve and handle controls the amount of flow of hot and cold water, respectively, and thereby controls the total flow, as well as the temperature of the water. Today, faucet sets with two faucet valves and two handles typically have only one faucet spout through which mixed hot and cold water is discharged; however, some older dual-valve faucet sets may have two faucet spouts, one for each valve and handle, respectively. Other faucet sets control both the hot water and cold water with a single faucet valve and handle that controls the amount of flow of both hot and cold water in one action, thereby controlling the total flow, as well as the temperature of the water, in one action. Faucet sets with a single faucet valve have one faucet spout, through which the mixed hot and cold water flows.

Faucet sets are mentioned in many places in the remainder of this specification. Some examples of faucet sets include, but are not limited to, any water delivery plumbing device comprised of a single faucet valve and handle or a dual faucet value and two handles, plus one or more faucet spouts. For the purpose of this specification, any and all faucet sets may be referred to in the singular as a faucet. In the remainder of this specification, faucet sets may also be referred to simply as faucets. In addition, faucet spouts are mentioned in many places in the remainder of this specification. Examples of faucet spouts include, but are not limited to, a spout, spigot, bibb, bibcock, hydrant, nozzle, stopcock, tap, valve, or other outlet for water. In the remainder of this specification, faucet spouts may also be referred to simply as spouts.

U.S. Pat. No. 8,307,851 taught that a sink or other container may be provided with a user-controlled flow control device ("flow control device" or "FDC") in addition to a faucet that controls the temperature and flow rate of the water issuing from the faucet spout. The flow control device may be mechanical, electrical, electronic, hydraulic, pneumatic, or a combination of mechanical, electrical, electronic, hydraulic, and/or pneumatic. The flow control device affects only the flow after the temperature of the water, which is a ratio of hot water to cold water, and the flow rate have been initially selected or subsequently readjusted by the user of the faucet. The activator of the flow control device could be an additional knob on the faucet, a foot, knee, waist, or thigh pedal, push bar, or button, and/or a photo or voice sensor, or some other activator device, mechanical, electrical, electronic, hydraulic, pneumatic, or otherwise. For example, the activator may be a button that is pressed with the toe or sole of the foot; or a pressure bar at the front of the sink which can be activated with the knee, hip, or stomach; or by a photoelectric or motion-sensing device; or by a voice-activated device. (For the purpose of this specification, the word "actuator" is used interchangeably to represent any or all of the aforementioned activator devices. Moreover, anywhere in the specification where the word "pedal" appears, any of the other actuators may be specified to obtain another embodiment.) In an embodiment, the default position of the flow control device is "off," i.e., when the user has not activated the flow control device, or has ceased to activate the flow control device, no water flows through the faucet.

In an embodiment, the user first opens the valves in the flow control device by activating the actuator. With the flow control device now "on," the user then sets the desired temperature and maximum flow rate by adjusting the amount of hot and cold water at the faucet. After the user has initially set, or has readjusted, the water temperature and flow, the flow control device allows the user to shut off the flow of water partially or completely without again touching the faucet by ceasing to activate, or by only partially activating, the actuator. When the user wishes to restore water flow, or to increase water flow by any amount up to the full amount set at the faucet, he or she engages the FDC actuator, which then "recalls" the temperature and maximum flow rate (or a portion thereof) to which the faucet had been previously set.

For example, if the user wishes to rinse a stack of dishes before placing them in the dishwasher, he or she would only need to initially turn on the water at the faucet to the desired temperature and flow while activating the flow control device to "on." The user rinses the first dish, then ceases to activate the flow control device, which turns the flow control device "off," which in-turn blocks the water flow to the faucet, as he or she places the dish in the dishwasher. To rinse the second dish, the user again activates the flow control device, and again water flows from the faucet at the user's desired pre-set flow and temperature. Again, while the user is placing the second dish in the dishwasher, he or she ceases to activate the flow control device and the water flow is again interrupted. The ability to turn the faucet on repeatedly at the same pre-set temperature and flow is in contrast to other pedal-type water faucets that merely substitute pedals for hand faucets. In other words, the flow control device facilitates repetitive use of the faucet at the desired flow and temperature consistently, conveniently, and easily. Also, current pedal-faucets have no ability, or only a limited ability, to make fine adjustments to the temperature or flow, thereby rendering current pedal faucets largely unsuitable for household or commercial kitchen and bathroom sinks.

Installation of the flow control device is easy, generally requiring only a wrench and screwdriver for flexible water pipes and little or no plumbing skills. For example, in a typical residential environment, the installer opens the under-sink cabinet to access the current water pipes, shuts the hot and cold water off at their respective shut-off valves, unscrews and removes the existing water pipes, screws the FDC housing onto the back wall of the under-sink cabinet, and connects new flexible water pipes from the shut-off valves to the faucet control device and from the faucet control device to the faucet. The installer then attached the cable to the rack in the flow control device and secures the cable to the walls of the cabinet so that the cable then emerges at the front of the cabinet or elsewhere at the place where the actuator will be positioned. The installer attaches the actuator to the cabinet (typically in the toe-space below the cabinet) or as elsewhere desired and then attaches the cable to the actuator. If required, the installer adjusts the travel of the cable and rack by moving the cotter pin, which attaches the cable to the rack, to one of several different positions on the rack, and/or replaces the pinions on the flow control device with different size pinions. After testing the system, the installation process is complete. After installation, the flow control device is easily accessible to the user, if, for example, the user wishes to install a new sink and/or faucet. In a commercial environment where flexible pipes are being used, the under-sink area is frequently not enclosed in a cabinet, making installation of the flow control device that much easier. Some level of expert plumbing knowledge would be necessary only in situations in which rigid water pipes are in use.

In an embodiment, the flow control device is installed on paired hot and cold water pipes that supply water to a faucet. In an embodiment, as soon as the FDC actuator is released, the water flow stops. Consequently, water is conserved, because as soon as the user ceases to activate the flow control device, water usage ceases. Alternatively, water can also be conserved when the user only partially activates the flow control device, which results in less than the pre-set maximum flow rate passing through the flow control device to the faucet.

The flow control device may be installed at any point along the water pipes that supply the faucet, so long as the flow control device is installed on both water pipes, hot and cold, that supply the faucet. Alternatively, the flow control device may be installed on a single pipe that contains both hot and cold water after the hot and cold water has been mixed. In an embodiment in which the flow control device is installed on both pipes, if the pipes are close enough together, a single flow control device may be used to control the flow of the water through both pipes. In contrast, if the pipes are separated by some distance, rendering use of a single flow control device impractical, two separate flow control devices can be installed, one on each water pipe, and both flow control devices may be connected to the same actuator or be otherwise coordinated to open and close together. Flexible or rigid water pipes may be used to connect the flow control device to the water shut-off valves, and to connect the flow control device to the faucet; however, as noted above, using rigid pipe typically requires a higher level of expertise and more time to install. The FCD actuator may be any device that activates the flow control device, thereby opening the valves and permitting water to flow. Examples include, but are not limited to: a foot pedal installed in the toe-space under a sink on which the user steps; a lever activated by moving the foot to the side, applying lateral pressure to the lever; or any of the other actuators described above. In an embodiment, the actuator may be responsive to different pressures, enabling the user to control flow by applying different amounts of pressure or otherwise activating the actuator only partially.

A problem not realized and addressed in the U.S. Pat. No. 8,307,851 was that using a single flow control device as previously suggested in a single pipe that contained both hot and cold water resulted in the inability to control a varying range of final temperatures at the faucet. This is because the hot and cold water would need to be mixed before reaching the hot and cold faucet valves. Also, if you wanted to keep the ability to adjust the hot and cold water temperature, it required the installation of two flow control devices. Also, it is desired that the flow control device could be simplified thereby lowering the cost and improving the reliability of the overall system. Accordingly, there is a need for an improved flow control device that is more reliable, easier to install and cheaper to produce. The present invention fulfills these needs and provides other related advantages.

SUMMARY OF THE INVENTION

An exemplary embodiment of a hands-free faucet control device includes a water valve assembly and a foot pedal assembly. The water valve assembly includes a housing with two input ports and two output port configured to be attachable in series with a hot water pipe and a cold water pipe. A valve includes two through holes and is movable in the housing between a closed position and an open position. In the open position the two through holes are in alignment with the two input and output ports. In the closed position the two through holes are not in alignment with the two input and output ports. A spring is biased against the valve keeping the valve in the closed position.

The foot pedal assembly includes a bracket attachable to a structural support. A foot pedal is attached to the bracket, where the foot pedal is movable between an up position and a down position. A pull wire is connected at a proximal end to the valve and connected at a distal end to the foot pedal. Movement of the foot pedal to the down position by a user moves the valve to the open position.

In one embodiment the valve translates within the housing and the spring is a compression spring. At least one seal may be placed between the valve and the housing to prevent water leakage.

In another embodiment the valve rotates within the housing and the spring is a torsion spring. A circular wire guide is attached to the valve wherein the pull wire at the proximal end is connected to the circular wire guide. At least one seal may be placed between the valve and the housing to prevent water leakage.

The pull wire may include a sheath to allow the pull wire to smoothly move within.

At least one wire guide may be attachable to a structural surface, wherein the at least one wire guide is configured to secure a portion of the pull wire between the proximal and distal ends.

Another embodiment may include a foot activated hold-down switch pivotably attached to the pedal. The foot activated hold-down switch includes a protrusion configured to engage a notch located on the bracket. A lever may be pivotably connected at one end to the bracket and connected at the other end to the pedal.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
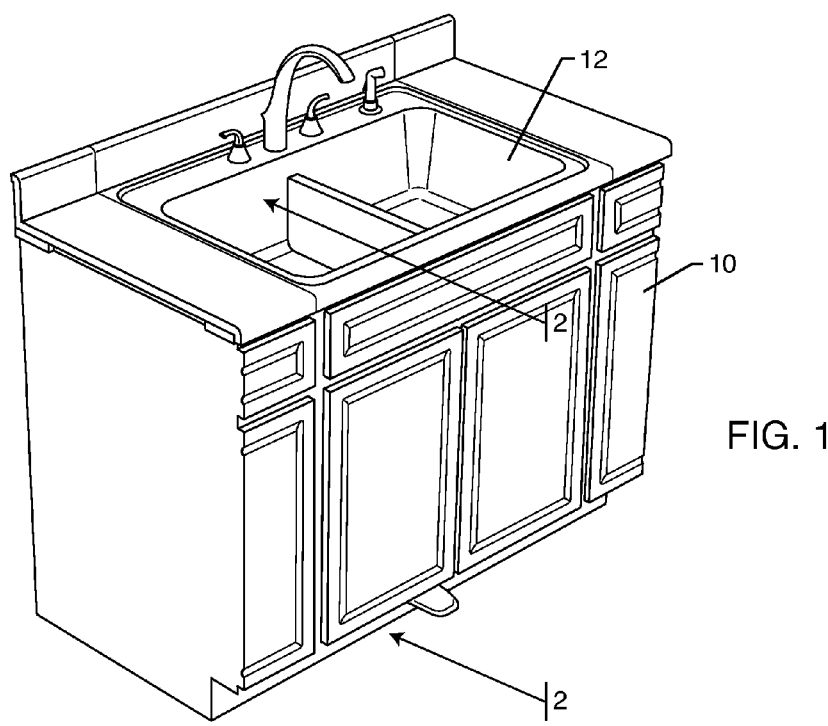
FIG. 1 is a perspective view of a cabinet with a sink that would house the present invention.
Figure 2:
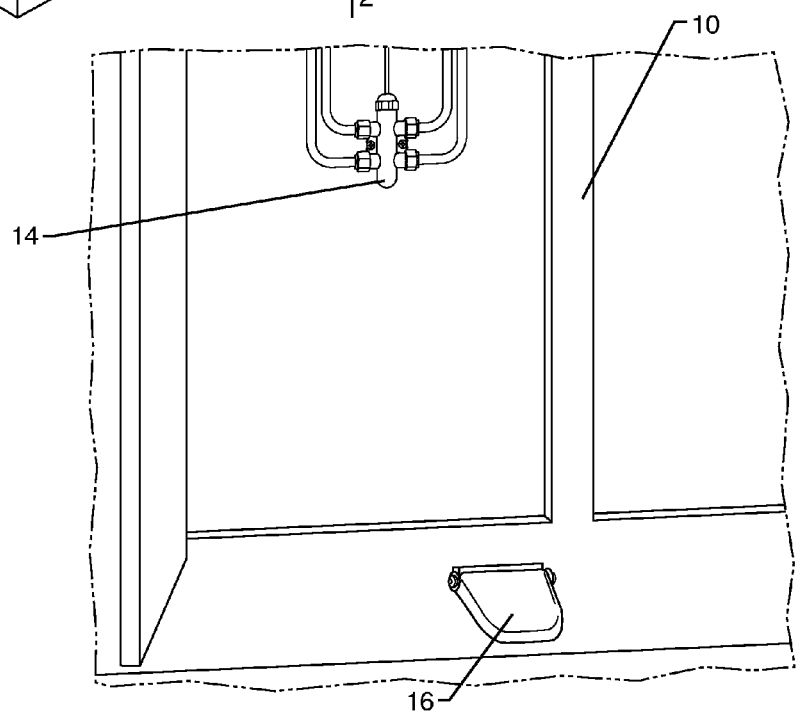
FIG. 2 is a perspective view of the cabinet of FIG. 1 now opened showing an embodiment of the present invention as a valve assembly and a foot pedal assembly.

FIG. 1 is a perspective view of a cabinet 10 with a sink 12 that would house the present invention. FIG. 2 is a perspective view of the cabinet 10 of FIG. 1 with its door opened now showing an embodiment of the present invention as a valve assembly 14 and a foot pedal assembly 16.

Figure 3:
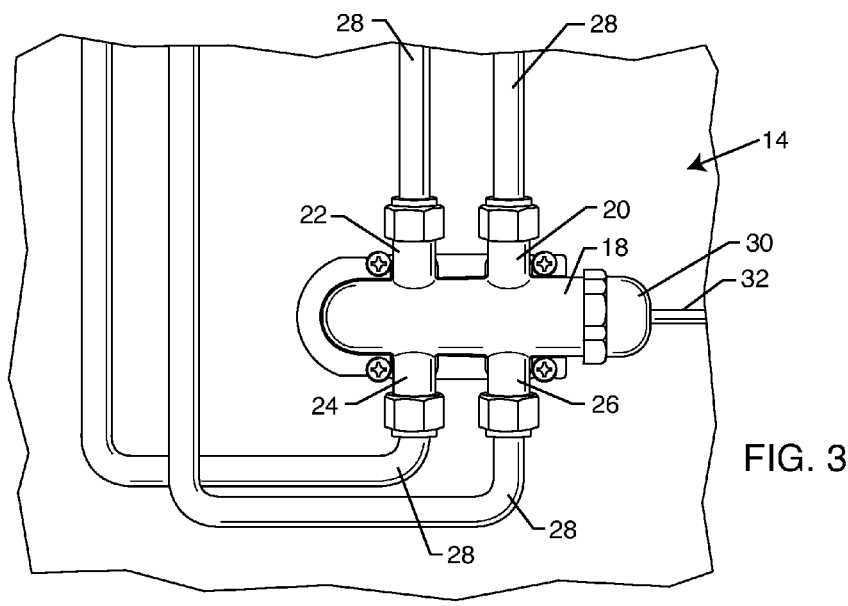
FIG. 3 is a close-up perspective view of a valve assembly of the present invention turned horizontal.
Figure 4:
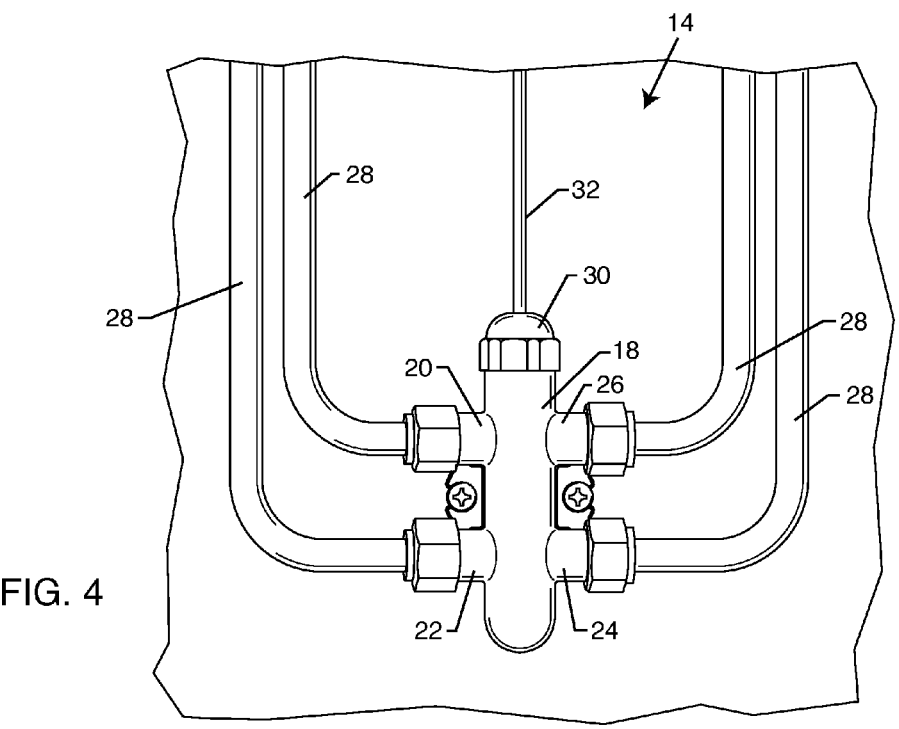
FIG. 4 is a close-up perspective view of a valve assembly of the present invention turned vertical.

As will be shown in the figures, the orientation of the present invention may vary from vertical to horizontal or any variation there between. FIG. 3 is a close-up perspective view of a valve assembly of the present invention turned horizontal and FIG. 4 is a close-up perspective view of a valve assembly of the present invention turned vertical. An outside housing 18 can be seen that has a first input port 20, a second input port 22, a first output port 24 and a second output port 26. It will be understood by those skilled in the art that the location of the input versus output ports can be switched. The input ports and output ports are connected to the hot and cold water lines 28. The location of the hot and cold water lines can be switched, as their orientation works both ways with the present invention.

Also shown is a cap 30 that has a sheathed pull wire 32 there through. It is understood that the pull wire may not be sheathed and still work with the present invention. However, providing a low friction sheath aids in movement of the pull wire as it is wrapped and bent into position.

Figure 5:
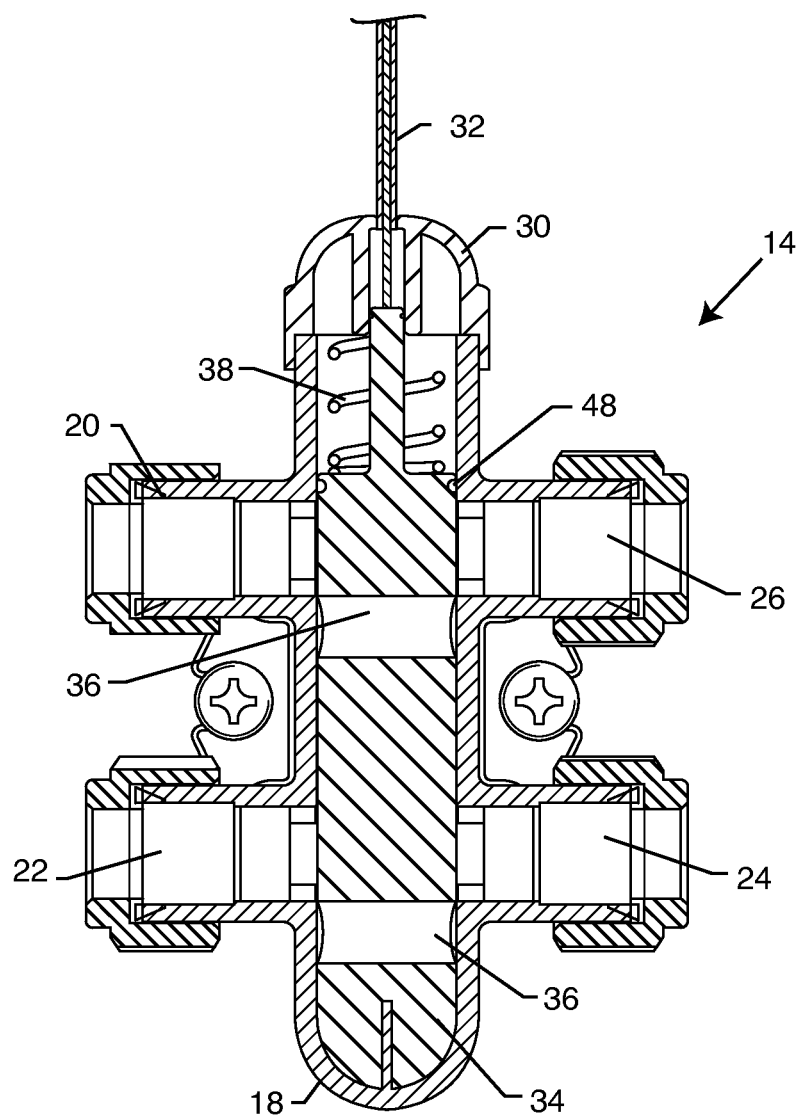
FIG. 5 is a sectional view of the structure of FIG. 4.

FIG. 5 is a sectional view of the structure of FIG. 4. In this embodiment a valve 34 is designed to translate within the housing 18. Within the valve are two holes 36. The two holes 36 are spaced an equal distance apart as are the ports 20 and 22 and also 24 and 26. A compression spring 38 biases the valve 34 so that the holes 36 in the valve does not line up to the ports. In this manner water is restricted from flowing through the novel valve assembly 14. When a user pulls on the pull wire it then overcomes the preload of the spring 38 and opens the valve assembly 14 such that water can flow. The Applicant has integrated the both the hot and cold water into a single valve assembly without losing the ability to adjust the water flow at the sink 12 or faucet. In this manner, a precise temperate can be set by the user so that when the valve 34 is opened a repeatable temperature is achieved as the sink 12.

Figure 6:
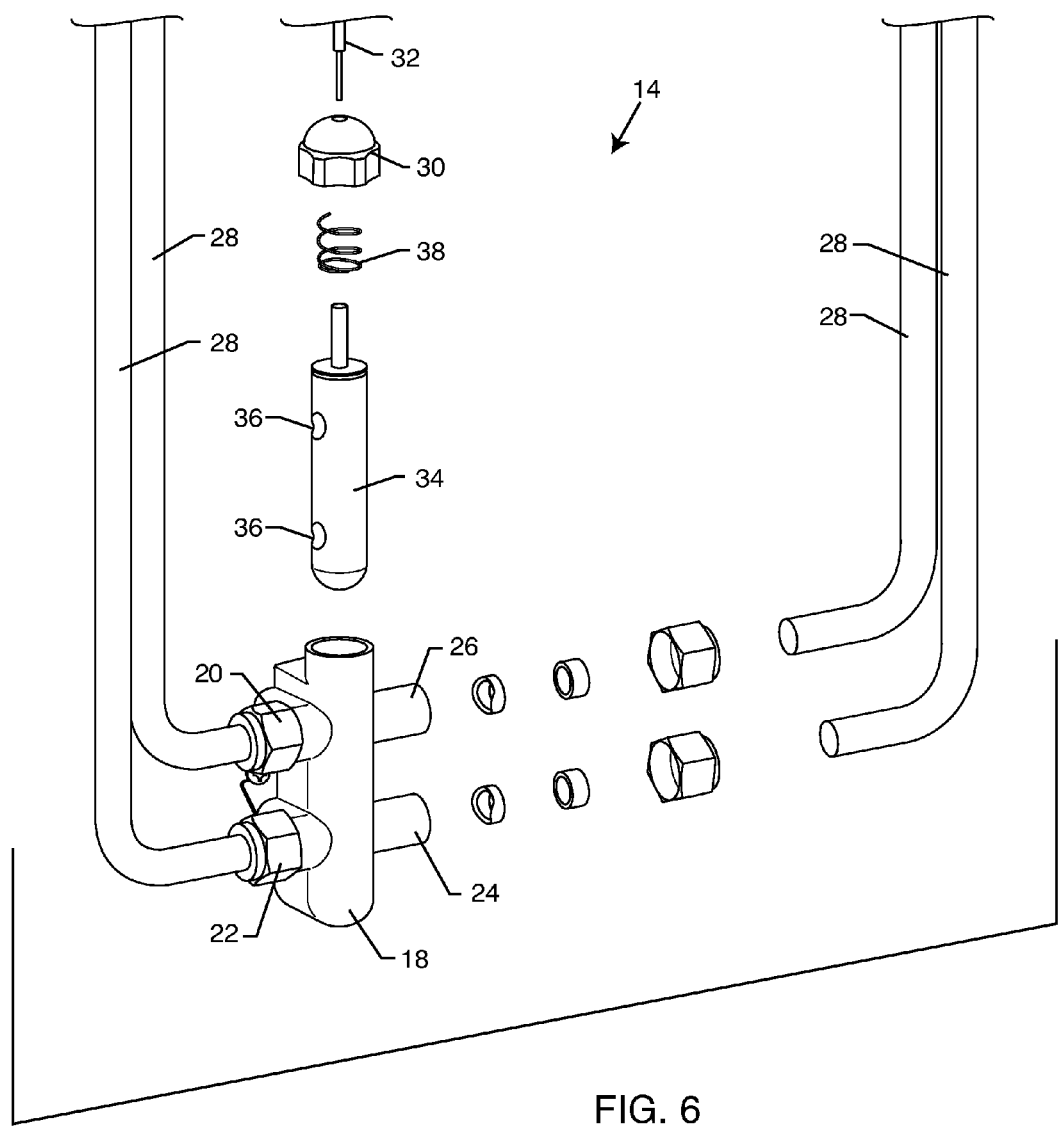
FIG. 6 is an exploded perspective view of the structure of FIG. 4.

FIG. 6 is an exploded perspective view of the structure of FIG. 4. The fittings/ports used on the housing 18 are traditional water fittings commonly used in the industry. It is understood that any fitting can be used with the present invention to hook up a hot and cold water line 28 to the present invention.

Figures 7, 8:
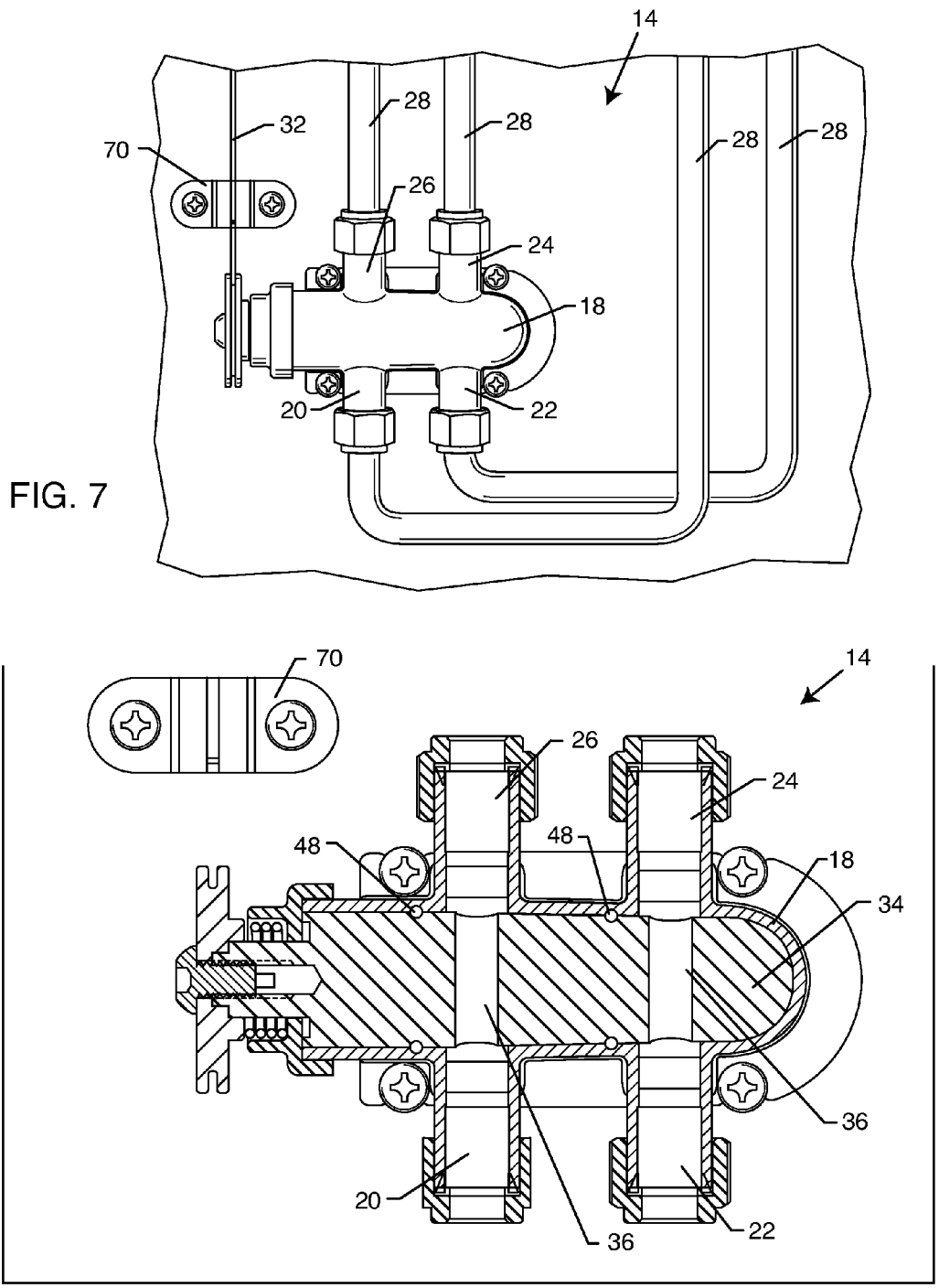
FIG. 7 is a close-up perspective view of another embodiment of the present invention.
FIG. 8 is a sectional view of the structure of FIG. 7.
Figure 9:
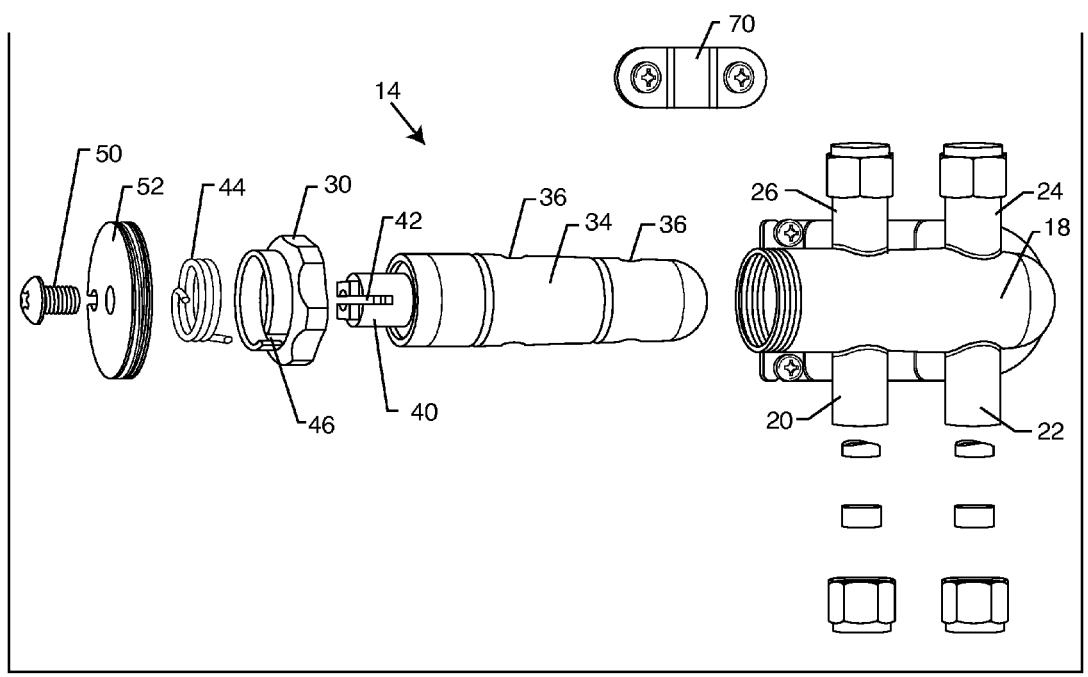
FIG. 9 is an exploded perspective view of the structure of FIG. 7.
Figure 10:
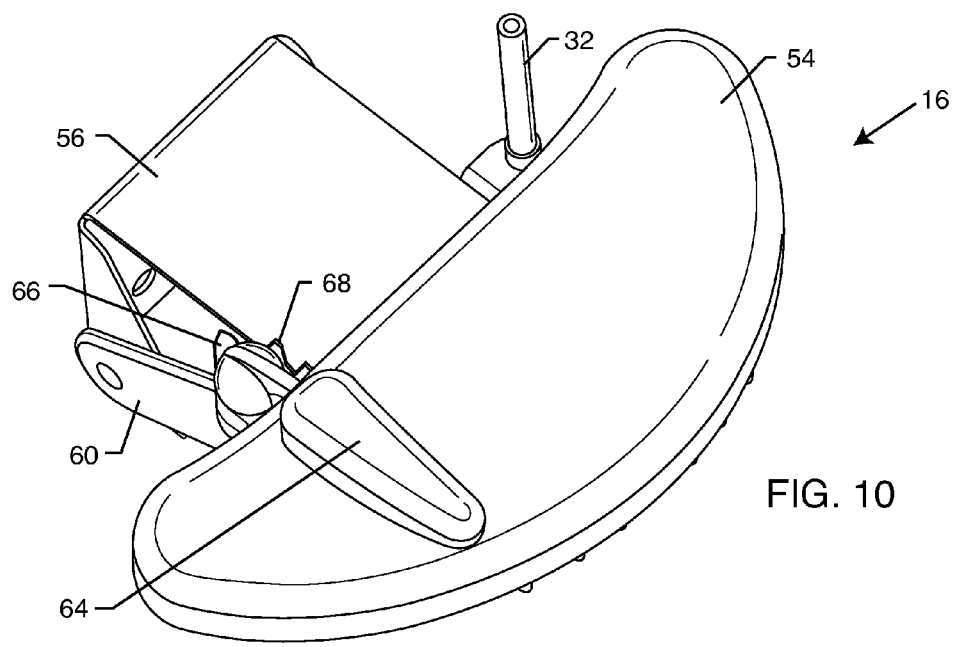
FIG. 10 is a perspective view of an exemplary foot pedal assembly of the present invention.
Figure 11:
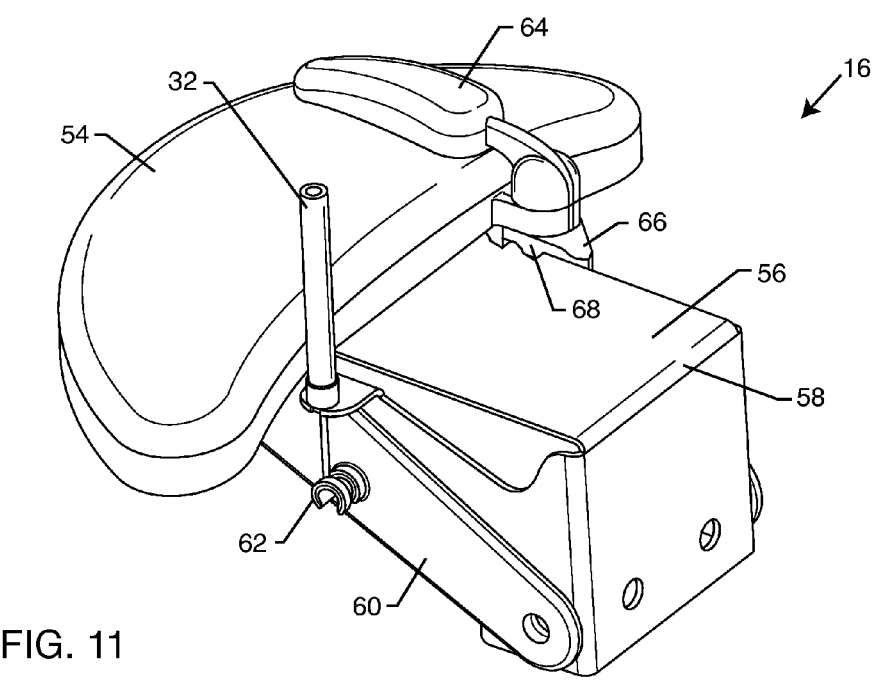
FIG. 11 is a rear perspective view of the structure of FIG. 10.
Figure 12:
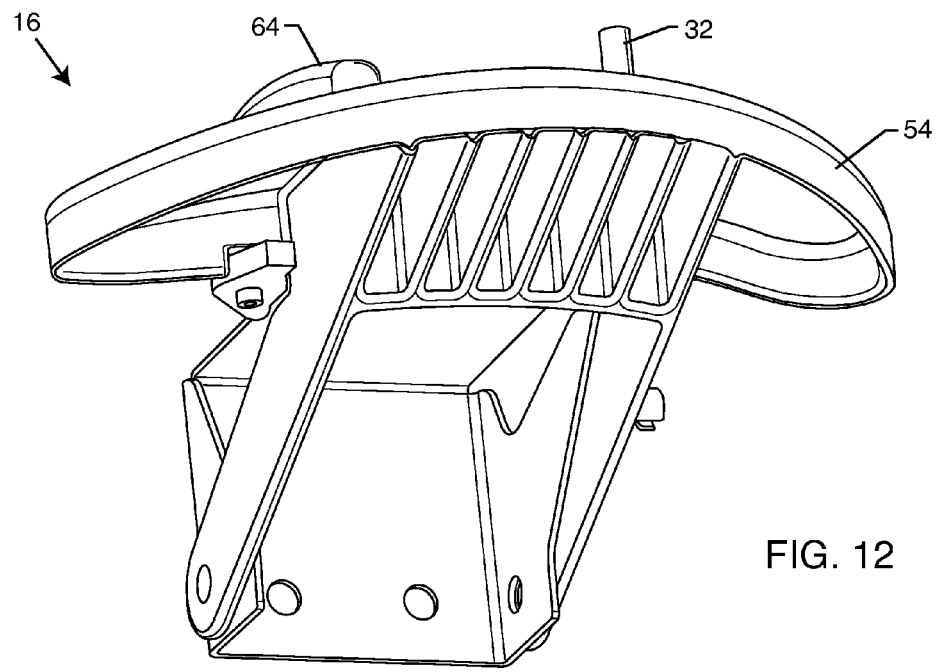
FIG. 12 is an upward perspective view of the structure of FIG. 10.
Figure 13:
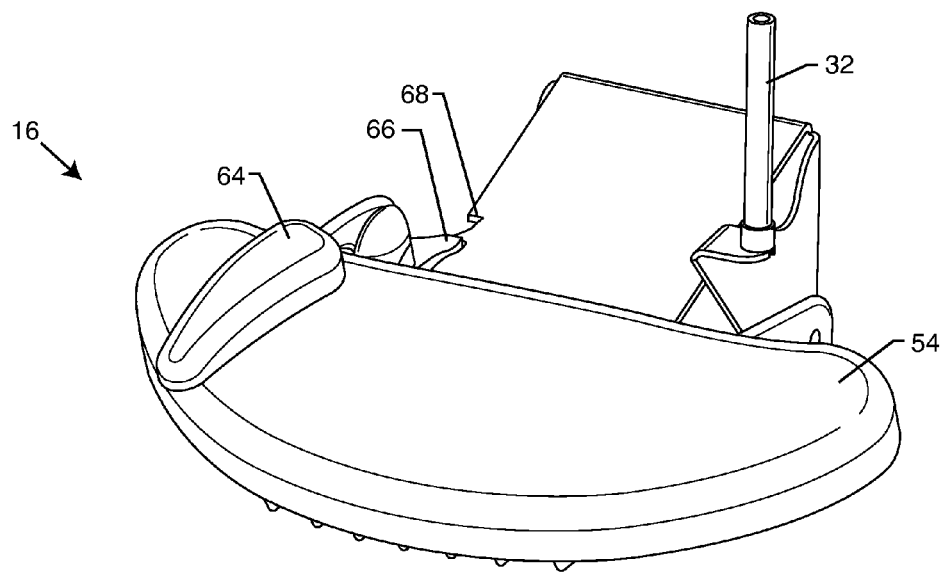
FIG. 13 is a perspective view of the structure of FIG. 10 now in the down position.
Figure 14:
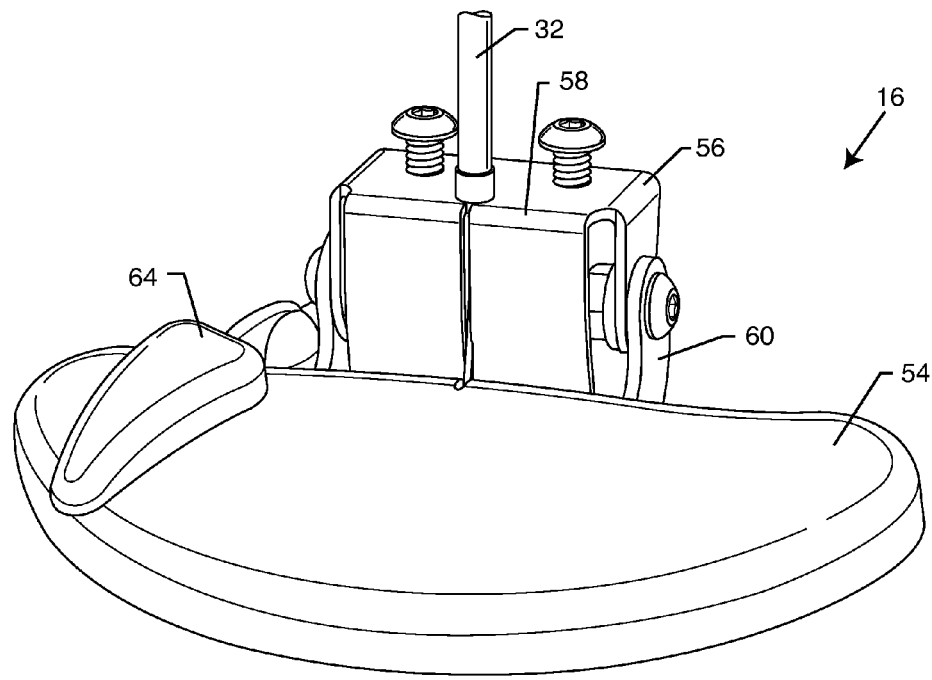
FIG. 14 is a perspective view of another exemplary foot pedal assembly of the present invention.
Figure 15:
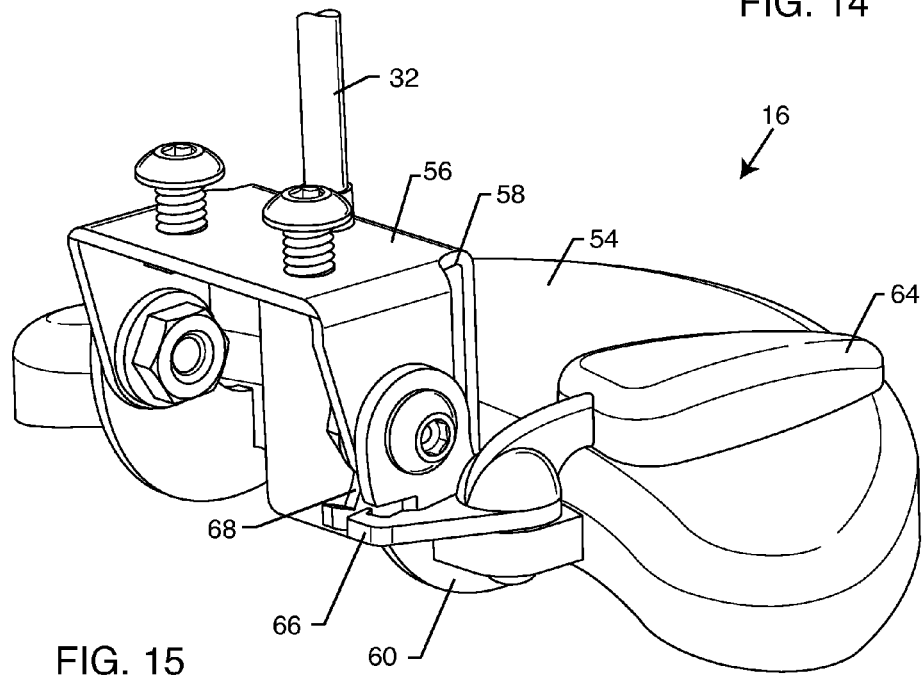
FIG. 15 is a rear perspective view of the structure of FIG. 14.
Figure 16:
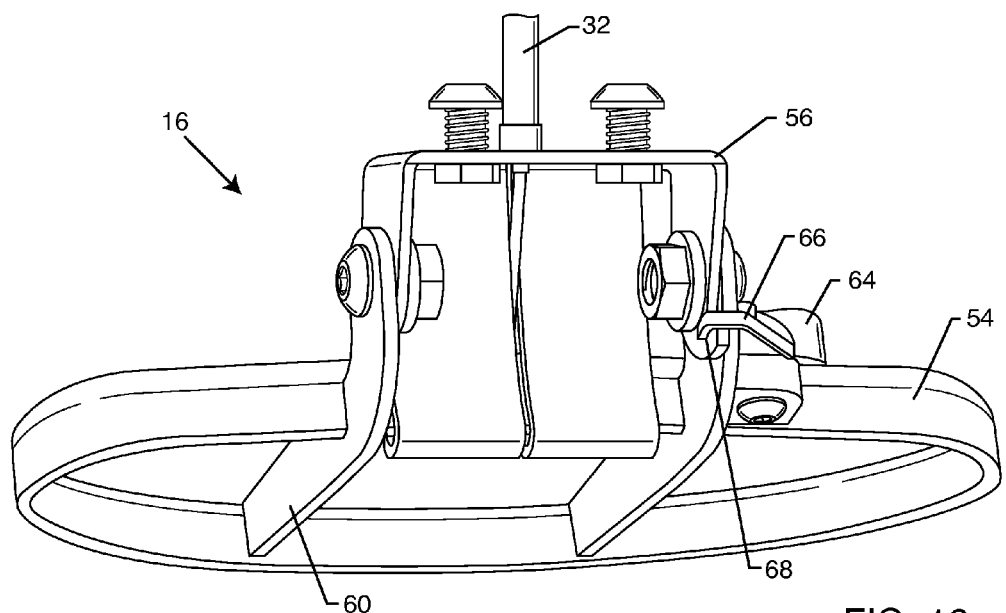
FIG. 16 is an rear perspective view of the structure of FIG. 14 now in the down position.
Figure 17:
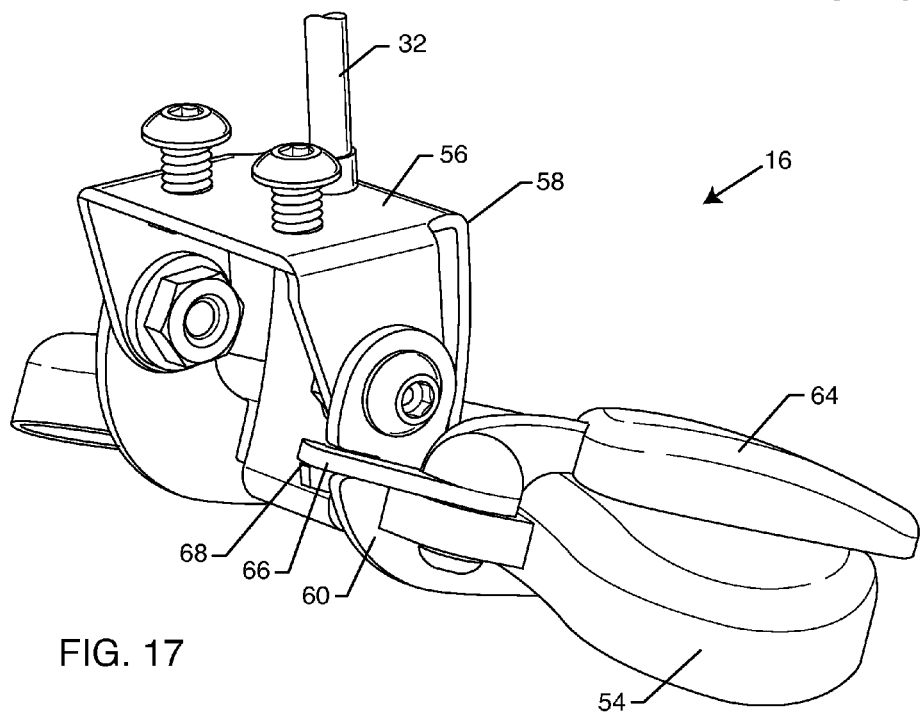
FIG. 17 is a perspective view of the structure of FIG. 14 similar to the view of FIG. 15 now in the down position.

FIG. 7 is a close-up perspective view of another embodiment of the present invention. FIG. 8 is a sectional view of the structure of FIG. 7 and FIG. 9 is an exploded perspective view of the structure of FIG. 7. The embodiment in FIGS. 7-9 now has a rotatable valve 34. The valve 34 still has two holes 36 but now the valve 34 is configured to rotate within the housing 18 to either align the holes 36 with the ports or not to align the holes 36 with the ports. The valve 36 has an extension 40 with a notch 42. The notch 42 is designed to accept one end of a torsion spring 44 that resists rotational movement. The other end of the torsion spring 44 is configured to engage a notch or catch 46 on the cap 30. This embodiment has two seals 48 shown that prevent water leakage outside the housing 18, whereas the embodiment shown in FIGS. 3-6 required one seal 48. Another notable feature is that the valve 34 is slightly tapered and is matched to a slightly tapered housing 18.

A fastener 50 attaches a circular wire guide 52 to the valve 34. The cap 30 then screws onto the housing 18 to complete the assembly. The sheathed pull wire 32 pulls on the circular wire guide 52 and causes it to rotate. When the circular wire guide 52 rotates so does the valve 34. The sheathed pull wire 32 is held in place along the cabinet through one or many wire guides 70. Guides 70 capture the sheathed guide wire 32 and are fastened, glued, bonded or adhered to the inside of the cabinet 10.

FIGS. 10-13 show an exemplary foot pedal assembly 16 of the present invention. A pedal 54 is designed to remain in an upright position and the user simply steps upon the pedal 54 to open the valve assembly 14. As the pedal 54 moves downward, it pulls on the pull wire of the sheathed guide wire 32 which then pulls or rotates the valve 34 inside the housing 18.

In this embodiment the pedal 54 remains upright because the bracket 56 is biased in an upright position. The bracket 56 acts as a support but also as a spring. The bracket 54 bends about corner 58. The bracket is made of a flexible and resilient material such as spring steel or the like. The pedal 54 is attached to a lever 60. Together the bracket 56 and lever 60 control the movement of the pedal 54. Also shown is a wire catch 62 that attaches to the distal end of the sheathed pull wire 32. The wire catch 62 is attached to the wire of the sheathed pull wire.

Another novel feature of the present invention is the addition of a hold down feature. A switch 64 is positioned directly above the pedal 54. When a user steps upon the pedal 54, they may also then move their foot to the side activating the rotatable/pivotable switch 64 to keep the pedal 54 down without having to keep one's foot constantly upon the pedal 54. As can be seen in these views, the switch 64 includes a protrusion 66 that engages into a notch 68 formed into the bracket 56. Several notches 68 may be used to provide numerous levels of on.

FIGS. 14-17 show another embodiment of a foot pedal assembly 16. The function of FIGS. 14-17 is similar to FIGS. 10-13 while the structure is different. The sheathed guide wire 52 is designed to come down in the middle of the foot pedal assembly 16. The bracket 56 still flexes but is shaped differently. The foot pedal assembly of FIGS. 14-17 is designed to be attached to the floor of the cabinet whereas the embodiment in FIGS. 10-13 is designed to be attached to the vertical kickboard at the base of the cabinet. It will be understood by those skilled in the art that a spring or bias mechanism could also be used to bias the pedal 54 in an upright manner.

Figure 18:
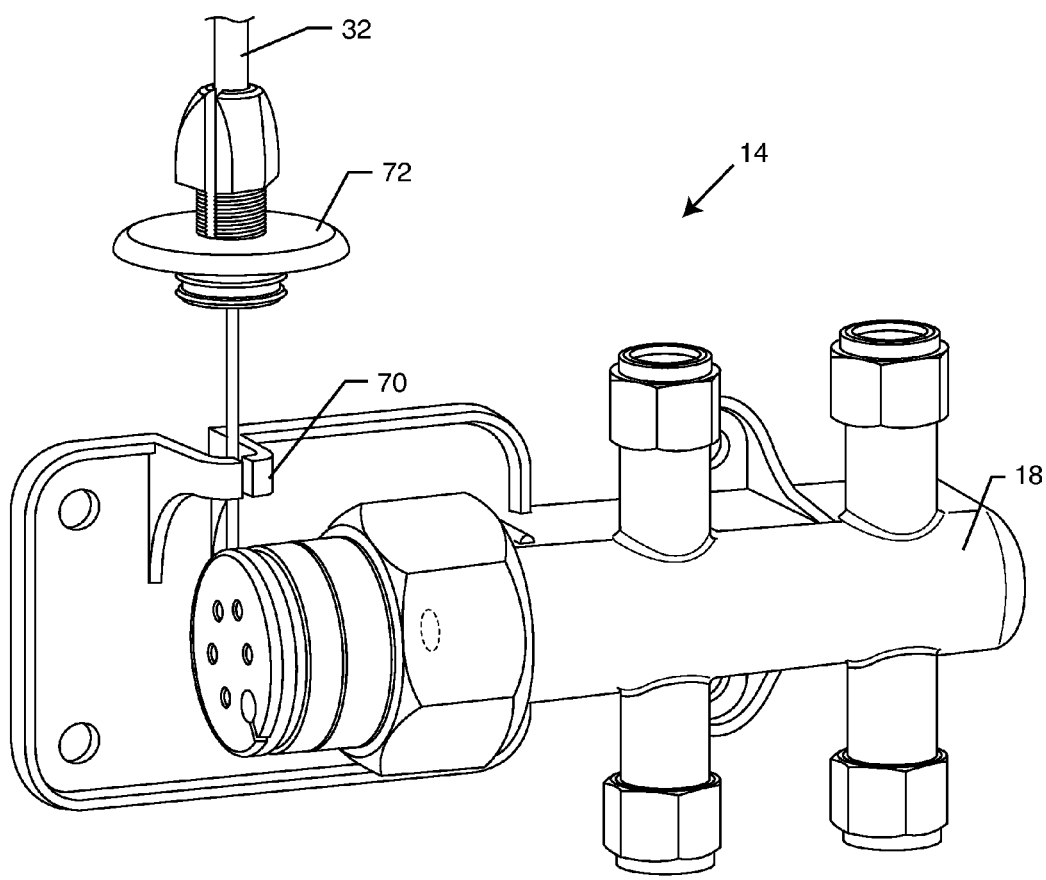
FIG. 18 is a perspective view of another exemplary embodiment of a valve assembly of the present invention.
Figure 19:
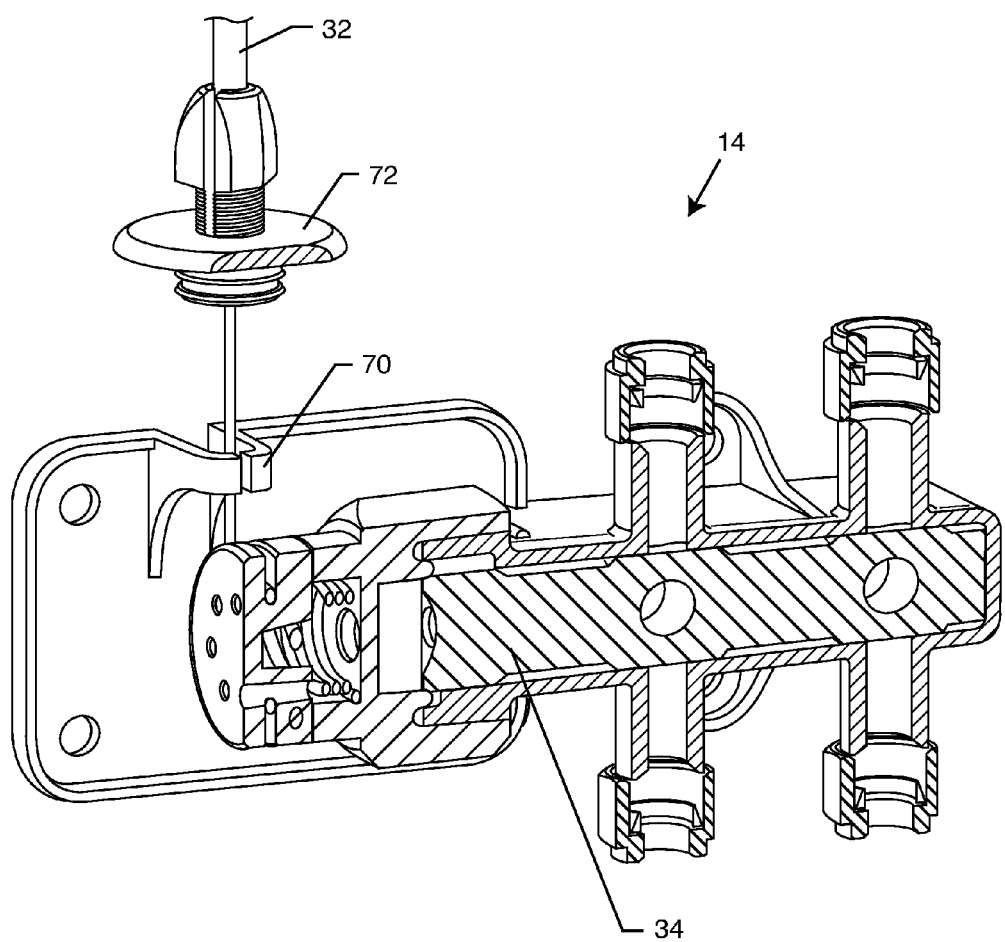
FIG. 19 is a sectional view of the structure of FIG. 18.

FIGS. 18 and 19 show another embodiment of the valve assembly 14. The outside housing 18 now has the wire guide 70 integrated into the housing structure 18. A tension knob assembly 72 would be attached to the lower floor of the cabinet and directly above where the sheathed pull wire 32 would naturally come upwards. The tension knob allows a user to fine tune the tension on the pull wire 32 such that there is no slop or play in the system when in use. The valve 34 also has a reduced diameter at various sections so now there are only two contact areas which helps to create a better sealing surface with less friction. In FIG. 19 the extension 40 is not shown, but would be a separate piece and screw or fasten into the valve 34.

Although several embodiments have been described in detail for purposes of illustration, various modifications may be made to each without departing from the scope and spirit of the invention. Accordingly, the invention is not to be limited, except as by the appended claims.

What is claimed is:

1. A hands-free faucet control device, comprising:
   a) a water valve assembly, comprising:
      i) a single, cylindrically-shaped housing including two input ports and two output ports configured to be attachable in series with a hot water pipe and a cold water pipe;
      ii) a single, cylindrically-shaped valve including two through holes, where the cylindrically-shaped valve is aligned inside the cylindrically-shaped housing and movable in the housing between a closed position and an open position, where in the open position the two through holes are in alignment with the two input and output ports and in the closed position the two through holes are not in alignment with the two input and output ports;
      iii) a spring biased against the valve keeping the valve in the closed position;
   b) a foot pedal assembly, comprising:
      i) a bracket attachable to a structural support;
      ii) a foot pedal attached to the bracket, where the foot pedal is movable between an up position and a down position; and
   c) a pull wire connected at a proximal end to the valve and connected at a distal end to the foot pedal, wherein movement of the foot pedal to the down position by a user moves the valve to the open position.

2. The device of claim 1, wherein the valve translates within the housing.

3. The device of claim 2, wherein the spring comprises a compression spring.

4. The device of claim 1, wherein the valve rotates within the housing.

5. The device of claim 4, wherein the spring comprises a torsion spring.

6. The device of claim 5, including a circular wire guide attached to the valve wherein the pull wire at the proximal end is connected to the circular wire guide.

7. The device of claim 1, wherein the pull wire comprises a sheathed pull wire.

8. The device of claim 1, including at least one wire guide attachable to a structural surface, wherein the at least one wire guide is configured to secure a portion of the pull wire between the proximal and distal ends.

9. The device of claim 1, including a foot activated hold-down switch pivotably attached to the pedal.

10. The device of claim 9, wherein the foot activated hold-down switch includes a protrusion configured to engage a notch located on the bracket.

11. The device of claim 1, including at least one seal between the valve and the housing.

12. The device of claim 1, including a lever pivotably connected at one end to the bracket and connected at the other end to the pedal.

13. A hands-free faucet control device, comprising:
   a) a water valve assembly, comprising:
      i) a single, cylindrically-shaped housing including two input ports and two output ports configured to be attachable in series with a hot water pipe and a cold water pipe;
      ii) a single, cylindrically-shaped valve including two through holes, where the cylindrically-shaped valve is aligned inside the cylindrically-shaped housing and translatable in the housing between a closed position and an open position, where in the open position the two through holes are in alignment with the two input and output ports and in the closed position the two through holes are not in alignment with the two input and output ports;
      iii) a compression spring biased against the valve keeping the valve in the closed position;
   b) a foot pedal assembly, comprising:
      i) a bracket attachable to a structural support;
      ii) a foot pedal attached to the bracket, where the foot pedal is movable between an up position and a down position; and
   c) a pull wire connected at a proximal end to the valve and connected at a distal end to the foot pedal, wherein movement of the foot pedal to the down position by a user moves the valve to the open position.

14. The device of claim 13, including a foot activated hold-down switch pivotably attached to the pedal.

15. The device of claim 14, wherein the foot activated hold-down switch includes a protrusion configured to engage a notch located on the bracket.

16. The device of claim 13, including a lever pivotably connected at one end to the bracket and connected at the other end to the pedal.

17. A hands-free faucet control device, comprising:
   a) a water valve assembly, comprising:
      i) a single, cylindrically-shaped housing including two input ports and two output port configured to be attachable in series with a hot water pipe and a cold water pipe;
      ii) a single, cylindrically-shaped valve including two through holes, where the cylindrically-shaped valve is aligned inside the cylindrically-shaped housing and rotatable in the housing between a closed position and an open position, where in the open position the two through holes are in alignment with the two input and output ports and in the closed position the two through holes are not in alignment with the two input and output ports;
      iii) a torsion spring biased against the valve keeping the valve in the closed position;
      iv) a circular wire guide attached to the valve;

b) a foot pedal assembly, comprising:
  i) a bracket attachable to a structural support;
  ii) a foot pedal attached to the bracket, where the foot pedal is movable between an up position and a down position;
c) a pull wire connected at a proximal end to the circular wire guide and connected at a distal end to the foot pedal, wherein movement of the foot pedal to the down position by a user moves the valve to the open position.

18. The device of claim 17, including a foot activated hold-down switch pivotably attached to the pedal.

19. The device of claim 18, wherein the foot activated hold-down switch includes a protrusion configured to engage a notch located on the bracket.

20. The device of claim 17, including a lever pivotably connected at one end to the bracket and connected at the other end to the pedal.

21. The device of claim 4, wherein the cylindrically-shaped valve and housing are both slightly tapered and matched to one another.

22. The device of claim 17, wherein the cylindrically-shaped valve and housing are both slightly tapered and matched to one another.

\* \* \* \* \*